United States Patent
Lu et al.

(10) Patent No.: US 11,875,534 B2
(45) Date of Patent: Jan. 16, 2024

(54) POSE ESTIMATION METHOD FOR UNMANNED AERIAL VEHICLE BASED ON POINT LINE AND PLANE FEATURE FUSION

(71) Applicant: Guangdong University of Technology, Guangzhou (CN)

(72) Inventors: Renquan Lu, Guangzhou (CN); Jie Tao, Guangzhou (CN); Hui Peng, Guangzhou (CN); Jianhong Weng, Guangzhou (CN); Yong Xu, Guangzhou (CN); Hongxia Rao, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/148,270

(22) Filed: Dec. 29, 2022

(65) Prior Publication Data
US 2023/0281868 A1 Sep. 7, 2023

(30) Foreign Application Priority Data
Mar. 2, 2022 (CN) .......................... 202210202988.4

(51) Int. Cl.
*G06T 17/00* (2006.01)
*G06T 7/73* (2017.01)
*B64C 39/02* (2023.01)

(52) U.S. Cl.
CPC .............. *G06T 7/74* (2017.01); *B64C 39/024* (2013.01); *G06T 17/005* (2013.01);
(Continued)

(58) Field of Classification Search
CPC ............. G06T 7/73; G06T 2207/10028; G06T 2207/10024; G06T 17/005;
(Continued)

(56) References Cited

U.S. PATENT DOCUMENTS

2020/0258202 A1* 8/2020 Cai .................. G06T 5/005

FOREIGN PATENT DOCUMENTS

| CN | 105913475 A | * | 8/2016 | ........... G06T 15/005 |
| CN | 109636897 A | * | 4/2019 | ........... G06T 17/005 |

(Continued)

OTHER PUBLICATIONS

Xiao, Ran & Du, Hao & Xu, Chaowen & Wang, Wei. (2020). An Efficient Real-Time Indoor Autonomous Navigation and Path Planning System for Drones Based on RGB-D Sensor. 10.1007/978-981-32-9050-1_4. (Year: 2020).*

*Primary Examiner* — Ian L Lemieux
(74) *Attorney, Agent, or Firm* — Getech Law LLC; Jun Ye

(57) ABSTRACT

The present invention provides a pose estimation method for an unmanned aerial vehicle based on point, line and plane feature fusion, the method comprises the following steps: S1 extracting an RGB image and a depth map by using an RGB-D camera; S2 constructing a plane parameter space (PPS) according to the depth map, and mapping the depth map from a Cartesian space to the plane parameter space (PPS); S3 constructing an inverse octree structure, comprising: reversely constructing cell nodes for the plane parameter space (PPS) according to an octree rule, and for each cell node, performing fitting by using Gaussian distribution; S4 extracting a plane feature, comprising: extracting the plane feature on the basis of degree of feature extraction algorithm of the inverse octree; S5 extracting a linear feature, comprising: extracting a linear feature on the RGB image by using LSD algorithm detection.

10 Claims, 5 Drawing Sheets

(52) U.S. Cl.
CPC ............... *G06T 2207/10024* (2013.01); *G06T 2207/10028* (2013.01); *G06T 2207/10032* (2013.01); *G06T 2207/20021* (2013.01); *G06T 2207/30244* (2013.01)

(58) Field of Classification Search
CPC ........... G06T 2207/10032; G06T 2207/30244; G01C 11/00; G01C 21/206; G06V 20/10; G06F 18/24323
See application file for complete search history.

(56) References Cited

FOREIGN PATENT DOCUMENTS

| | | | | |
|---|---|---|---|---|
| CN | 111179344 A | * | 5/2020 | |
| CN | 108564616 B | * | 9/2020 | ............... G06T 7/55 |
| CN | 112435262 A | * | 3/2021 | |
| CN | 113837277 A | * | 12/2021 | |
| CN | 116753937 A | * | 9/2023 | |

* cited by examiner

POSE ESTIMATION METHOD FOR UNMANNED AERIAL VEHICLE BASED ON POINT LINE AND PLANE FEATURE FUSION

TECHNICAL FIELD

The present invention relates to the technical field of intelligent interaction, and, particularly, relates to a pose estimation method for an unmanned aerial vehicle based on point, line and plane feature fusion.

BACKGROUND

An unmanned aerial vehicle has the advantages of flexible use, a strong adaptability and a high performance cost ratio. With the dual promotion of actual demand and technological development, application scope thereof is constantly expanding.

A pose estimation for an unmanned aerial vehicle refers to the steps of the process that the unmanned aerial vehicle uses information such as sensors to construct a map of a surrounding environment, acquire its own position and estimate its own posture etc. It is an important step to realize autonomous driving of the unmanned aerial vehicle. Accurate and highly robust pose estimation is of great significance to autonomous driving of the unmanned aerial vehicle.

At present, there are two main implementations to realize the motion planning of the unmanned aerial vehicle: one is to construct a three-dimensional map by means of laser SLAM or visual SLAM on the basis of feature points, and estimate the pose thereon; the other is to use external sensors, such as a GPS, UWB, and motion capturing device to estimate their own pose.

The shortcomings of the prior art mainly comprise: low positioning accuracy, weak anti-interference capability, easy loss of positioning in weak texture environment, expensive equipment etc. The key point of the unmanned aerial vehicle to realize motion planning is to realize accurate pose estimation. For the existing algorithmic approach of unmanned aerial vehicle pose estimation, the method of using external sensors such as a GPS and UWB to estimate an unmanned aerial vehicle pose requires high signal environment, and it is very easy to make mistakes in the environment without a GPS or in the environment with severe GPS interference. The method of using laser SLAM to estimate an unmanned aerial vehicle pose needs laser radar, which is expensive and has certain requirements for installation conditions, while the space of an unmanned aerial vehicle is precious and the load capacity is low, and therefore, laser SLAM is not a good strategy for estimating an unmanned aerial vehicle pose.

At present, a commonly used visual SLAM pose estimation algorithm mainly uses feature point information to estimate pose. For the weak texture environment, it is easy to fail in localization due to unable to extract suitable features. At the same time, the pose estimation scheme using feature points is easily interfered by conditions such as external rotation transformation, scale transformation and brightness transformation, which leads to the decrease of pose estimation accuracy.

SUMMARY

In view of the fact that the prior art has a relatively high requirement for environment or a hardware device to realize pose estimation and motion planning, the present invention is intended to provide a pose estimation method for a multi-rotor unmanned aerial vehicle with high accuracy and high robustness.

The objective of the present invention is implemented by using the following technical solutions: the present invention provides a pose estimation method for an unmanned aerial vehicle based on point, line and plane feature fusion, comprising:

S1 extracting an RGB image and a depth map by using an RGB-D camera;

S2 constructing a plane parameter space (PPS) according to the depth map, and mapping the depth map from a Cartesian space to the plane parameter space (PPS);

S3 constructing an inverse octree structure, comprising: reversely constructing cell nodes for the plane parameter space (PPS) according to an octree rule, and for each cell node, performing fitting by using Gaussian distribution;

S4 extracting a plane feature, comprising: extracting the plane feature on the basis of degree of feature extraction algorithm of the inverse octree;

S5 extracting a linear feature, comprising: extracting a linear feature on the RGB image by using LSD algorithm detection;

S6 extracting a point feature by combining an RGB map;

S7 constructing a point-line-plane association graph;

S8 performing matching on the basis of the point-line-plane association graph of two adjacent frames; and S9 estimating an unmanned aerial vehicle pose, comprising estimating the pose according to the matched plane feature; and when the number of plane features is insufficient such that the pose can't be solved, then estimating the pose by combining the linear feature or by using a feature point feature.

In one embodiment, the step S2 comprises: for any point p of the depth map in the Cartesian space, there being a plane $\pi=[n^T,d]^T$, which satisfies $\pi=[n^T,d]^T$, wherein $n^T=[n_x,n_y,n_z]^T$ is a normal vector of the plane, d is the distance from the origin point of a coordinate system to the plane; a mapping relationship between the plane parameter space (PPS) and the Cartesian space is as follows:

$$\begin{cases} \theta_{PPS} = \arccos(n_z) \\ \varphi_{PPS} = \arctan 2(n_y, n_x) \\ d_{PPS} = d \end{cases}$$

wherein $[\theta_{PPS},\varphi_{PPS},d_{PPS}]$ is the three axes of PPS, $[n_x, n_y, n_z, d]$ is the normal vector of the plane and the distance from the plane to the origin point of the coordinate system in Cartesian space as shown above; then the coordinates of the point p in the PPS can be expressed as $p=[\theta_{PPS},\varphi_{PPS},d_{PPS}]^T$.

In one embodiment, the step S2 further comprises: in order to avoid mapping to a singular point $n^T=[0,0,\pm1]^T$ during mapping, before mapping, analyzing and calculating a common rotation matrix R in all plane by using a principal component, and then when mapping from the Cartesian space to the PPS, firstly left multiplying the normal vector N of the plane with the matrix R, and similarly, when the PPS is mapped to the Cartesian space, left multiplying the point p in the PPS with $R^T$, and then performing inverse mapping, so as to ensure that the points mapped to the PPS keep away from the singular point as much as possible.

In one embodiment, the step S3 comprises: wherein each cell includes a position mean $m_{cell}^{pps}$, a covariance $S_{cell}^{pps}$ of data points in the PPS and the number $N_{cell}$ of data points included therein, which is denoted as cell={$m_{cell}^{pps}$,$S_{cell}^{pps}$, $N_{cell}$}.

In one embodiment, the step S4 comprises:

dividing the plane parameter space (PPS) as 64*64 small cubes, finding a cube set $Q^{pps}$, which includes a point count exceeding a set threshold $th^{pps}$ in a cube interval, by traversing the series of cubes, then using any cube C therein as eight sub-nodes of the inverse octree respectively by traversing the cubes in $Q^{pps}$, checking whether a corresponding seven sub-nodes are all in the set $Q^{pps}$ according to the octree, and if so, integrating the eight nodes into one big node $C_i^{up}$(i=1,2, ... 8), and updating the parameter of the big node by using the parameter cell={$m_{cell}^{pps}$,$S_{cell}^{pps}$,$N_{cell}$} of the eight nodes, if there are multiple groups of nodes in cube C that satisfy an integration condition, performing determining according to the number of groups that satisfy the requirements, if the number of groups is equal to 8 groups, then recombining the eight big nodes into a larger node $C^{up2}$, otherwise, only taking a big node $C_{max}^{up}$=max($C_i^{up}$) having the maximum number of data points $N_{cell}$, regarding other nodes as not being integrated, inserting the integrated nodes into the tail of the set $Q^{pps}$, and removing the node C from the set $Q^{pps}$; after the completion of traversal, regarding the remaining elements of the set $Q^{pps}$ as a corresponding cartesian space having a corresponding plane, the plane features of each plane being represented as $P_\pi$=($\pi$,$m^{pps}$,$S^{pps}$, $N^{pps}$), wherein $\pi$=$[n^T,d]^T$ is the location center and $m^{pps}$ is obtained by means of the inverse mapping.

In one embodiment, the step S5 comprises: detecting a line in the RGB image by using LSD algorithm, and projecting the linear into a three-dimensional camera coordinate system by combining depth map information, an obtained three-dimensional space linear parameter being represented as L=$[u^T,v^T]^T$, wherein v represents a unit normal vector of the line, u represents the normal vector of a plane composed of the line and the origin point of the camera, and the magnitude of a value of u represents the distance from the line to the origin point of the camera.

In one embodiment, the step S6 comprises: traversing the plane extracted in step S4, dividing the parts in the RGB map corresponding to each plane into 10*10 cells, and extracting 10 ORB feature points in each cell, only retaining a feature point with the maximum response value therein, and discarding the remaining feature points.

In one embodiment, the step S7 comprises: using the extracted feature points, plane and linear feature as the nodes of the association graph, setting the feature node as an inactive node, and setting the plane node and the linear node as active nodes;

constructing an edge $e_{\pi,p}$=[$\varphi_{\pi,p}$,index] between the feature point and the plane:

$$\varphi_{\pi,p} = \begin{cases} 0, & \text{the feature point belongs to the plane} \\ 1, & \text{the feature point does not belongs to the plane} \end{cases};$$

index=r*10+c, the feature point is extracted from the cell of the rth row and the cth column of the plane;

constructing an edge $e_{\pi,\pi}$=[$\omega$,$\theta_{ij}^{\pi\pi}$,$d_{ij}^{\pi\pi}$] between planes:

$$\omega = \begin{cases} 0, & \text{two planes are parallel } (\theta_{ij}^{\pi\pi} < \theta_{th}) \\ 1, & \text{two planes are not parallel} \end{cases};$$

$\theta_{ij}^{\pi\pi}$=arccos($n_i^T,n_j$), represents the angle between the normal vectors of two planes;

$$d_{ij}^{\pi\pi} = \begin{cases} |d_i - d_j|, & \text{two planes are parallel} \\ 0, & \text{two planes are not parallel} \end{cases};$$

$d_{ij}^{\pi\pi}$ represents the distance between plane i and plane j;

constructing an edge $e_{\pi,L}$=[I,$\theta_{ij}^{L\pi}$,$d_{ij}^{L\pi}$] between the plane and the line:

$$I = \begin{cases} 0, & \text{the line is parallel to the plane } \left(\left|\frac{\pi}{2} - \theta_{ij}^{L\pi}\right| < \theta_{th}\right) \\ 1, & \text{the line is not parallel to the plane} \end{cases};$$

$\theta_{ij}^{L\pi}$=arccos($v_i^T,n_j$), represents the angle between the line and the normal vector of the plane;

$$d_{ij}^{L\pi} = \begin{cases} |n_j^T[v_i]_x u_i + d_j|, & \text{the plane is parallel to the line} \\ 0, & \text{the plane is not parallel to the line} \end{cases}$$

wherein $d_{ij}^{L\pi}$ represents the distance between line i and plane j.

In one embodiment, the step S8 comprises: extracting a plane-linear feature from the two adjacent frames, recording the plane-linear feature as {$\pi_i^c$,$L_j^c$,$kp_{\pi i}^c$} and {$\pi_m^r$,$L_n^r$, $kp_{\pi i}^r$}, wherein c represents the current frame, r represents a reference frame, $\pi_i^c$ represents the ith plane feature extracted in the current frame, $L_j^c$ represents the jth linear feature extracted in the current frame, $\pi_m^r$ represents a feature point set of the ith plane in the current frame, $\pi_m^r$ represents the mth plane feature extracted in the reference frame, $L_n^r$ represents the nth linear feature extracted in the reference frame, and $kp_{\pi i}^r$ represents a feature point set of the ith plane in the reference frame; and respectively constructing the corresponding point-line-plane association graph; firstly, matching the feature points of two frames, wherein if there are two feature point sets $kp_{\pi k}^c$ and $kp_{\pi g}^r$, and a matching point pair thereof being larger than the set threshold $th_{kp}$, it is considered that the plane $\pi_k^c$ of the current frame and the plane $\pi_g^r$ of the reference frame are matched in color, so as to obtain a set of planes $O_\pi$={$\pi_a^c$, $\pi_b^r$} that match in color; for each plane pair {$\pi_{a0}^c$,$\pi_{b0}^r$} in $O_\pi$, in a neighborhood space $\Omega$ where $\pi_{a0}^c$ corresponds to a PPS coordinate, finding out all the plane pairs $O_{\pi fh}$={$\pi_f^c$, $\pi_h^r$} with the PPS coordinate being in $\Omega$, that satisfy $O_{\pi fh} \in O_\pi$ and $\pi_f^c$, as shown in FIG. 5. And using an edge relationship thereof to calculate the matching score:

$$Sc_\pi = \frac{1}{N_{Q\pi fh}} \sum_{O_{\pi fh}} |e_{\pi cf,\pi ca} \cdot \text{diag}(10, 1, 0.2) \cdot e_{\pi rh,\pi rb}^T|$$

wherein $N_{Q\pi fh}$ represents the number of plane pairs in the $O_{\pi fh}$, $e_{\pi cf,\pi ca}$ represents an edge of the plane $\pi_{f0}^c$ and the plane $\pi_{a0}^c$, and $e_{\pi rh,\pi rb}^T$ represents an edge of the plane $\pi_{h0}^r$ and the plane $\pi_{b0}^r$, {$\pi_{f0}^c$,$\pi_{h0}^r$}$\in O_{\pi fh}$. If $Sc_\pi$<3, it is considered that the plane pairs {$\pi_{a0}^c$,$\pi_{b0}^r$} are correctly matched plane pairs, otherwise, the plane pairs are considered to be mismatched plane pairs and are removed from the set $O_\pi$.

For each line in the extracted linear feature sets $L_j^c$ and $L_n^r$, respectively finding out, by means of the respective point-line-plane association graph, an associated plane set which belongs to the set $O_\pi$ after the mismatched plane pairs are removed; constraining the edge between an associated plane of $O_\pi$ to which the line belongs by using a least square method, so as to realize the matching between lines; wherein a constraint function $Sc_L$ is:

$$Sc_L = \mathrm{argmin}(\|\Sigma e_{Lcj,\pi c} \cdot \mathrm{diag}(10,1,0.2) \cdot e_{Lrn,\pi r}^T\|^2)$$

wherein $e_{Lcj,\pi c}$ and $e_{Lrn,\pi r}$ respectively represent the edge between the associated planes to which the line belongs to $O_\pi$; $Sc_L$ is a loss function of the least square method, and a matching process is to use the least square method to iteratively update $Sc_L$ and obtain a result that makes the shortest line matches; $\|\Sigma e_{Lcj,\pi c} \cdot \mathrm{diag}(10,1,0.2) \cdot e_{Lrn,\pi r}^T\|^2$ in a $Sc_L$ function represents a loss value obtained by means of the correlation graph assuming that the line $L_j^c$ and the line $L_n^r$ are matched line pairs.

In one embodiment, after the step S9, the method further comprises:

S10, estimating a plane pose and performing degradation detection, comprising: according to the plane feature pair set $O_\pi = \{\pi_a^c, \pi_b^r\}$ after removing the mismatched plane pairs, calculating a three-dimensional rotation transformation matrix $R \in SO(3)$ of the RGB-D camera and a translation transformation matrix $t \in R^3$, and minimizing the error of a plane feature matching;

$$E_\pi^R = \sum_{O_\pi} \|n_{\pi a}^c - R n_{\pi b}^r\|^2$$

$$E_\pi^T = \sum_{O_\pi} (d_{\pi a}^c - (d_{\pi b}^r - (n_{\pi a}^c)^T t))^2$$

in the formula, $E_\pi^R$ represents a rotation error of the plane feature matching; $E_\pi^t$ represents a translation error of the plane feature matching; $n_{\pi a}^c$ represents the normal vector of the plane in the current frame in a Cartesian coordinate system; $n_{\pi b}^r$ represents the normal vector of the plane in the reference frame in the Cartesian coordinate system; R represents a rotation transformation matrix from the reference frame to the current frame; $d_{\pi a}^c$ represents the distance from the plane $\pi_a^c$ in the current frame to the origin point of the coordinate system in the Cartesian coordinate system; $d_{\pi b}^r$ represents the distance from the plane $\pi_b^c$ in the reference frame to the origin point of the coordinate system in the Cartesian coordinate system; and t represents a translation transformation matrix from the reference frame to the current frame;

in order to detect whether the degeneration has occurred, constructing a matrix $H_E = \Sigma_{O_\pi} n_{\pi b}^r (n_{\pi a}^c)^T$ and performing SVD decomposition, if the matrix $H_E$ is a singular matrix and all three singular values are positive singular values, the degeneration having not occurred, and if there are two positive singular values and one zero singular value, degenerating to a solution with 5 degrees of freedom, otherwise degenerating to a solution with less than 5 degrees of freedom, wherein 5 degree of freedom degeneration pose estimation comprises: when degenerating to 5 degree of freedom, adding a linear feature matching error $$E_{L\pi}^t = E_\pi^t + \sum_{i=1}^{N_L} \|v_i^c \times q\| \cdot \|u_i^c - (R u_i^r + [v_i^c]_\times t)\|^2$$

while minimizing the translation error, wherein, $N_L$ is the number of the matched linear feature pair, $E_{L\pi}^t$ represents the translation error of combining plane feature matching and linear feature matching, which comprising: a translation error $E_\pi^t$ calculated according to the plane feature matching and translation error $$\sum_{i=1}^{N_L} \|v_i^c \times q\| \cdot \|u_i^c - (R u_i^r + [v_i^c]_\times t)\|^2$$

calculated according to the linear matching; $v_i^c$ represents the unit normal vector of the linear $L_i^c$ in the current frame; q is a right singular vector of the zero singular value after the SVD decomposition of the matrix $H_E$; $u_i^c$ represents the normal vector of the plane composed of the line $L_i^c$ and the origin point of the camera in the current frame; $u_i^r$ of represents the normal vector of the plane composed of the line $L_j^r$ and the origin point of the camera in the reference frame; t represents the translation transformation matrix from the reference frame to the current frame, and R represents the rotation transformation matrix from the reference frame to the current frame; and $[v_i^c]_\times$ is a cross product matrix corresponding to a vector $v_i^c$;

the lower degree of freedom pose estimation comprises: when degenerating to a lower degree of freedom less than 5 degrees of freedom, calculating an essential matrix by directly using the matching point feature point pair, and according to an eight-point method, performing SVD decomposition on the essential matrix and re-projecting by combining triangularization to obtain a projection matrix, and finally performing RO on the projection matrix to obtain a solution pose.

BENEFICIAL EFFECTS OF THE PRESENT INVENTION

Firstly, the present invention extracts various point-line-plane features for the condition of artificial environment such as indoor environment, which can more effectively represent the features of surrounding environment, avoid reducing the influence caused by non-texture features, and has higher environmental robustness and stronger application universality.

Second, the present invention can fuse point-line-plane features, construct point-line-plane feature association graph, and realize more accurate pose estimation by using the association among multiple features.

Thirdly, the present invention only uses the information brought by the RGB-D camera, and the pose estimation of the unmanned aerial vehicle in the environment without a GPS, and interference of a medium and weak magnetic field and the like has higher accuracy.

Fourthly, the present invention innovatively proposes the inverse octree algorithm, which can effectively reduce the speed weakening caused by node splitting and improve the pose estimation accuracy of the unmanned aerial vehicle.

Fifth, according to different pose estimation situations, the present invention uses lines to make up for degree of freedom degeneration, or uses feature points to make pose estimation with lower degree of freedom, thus solving the problem of plane pose estimation degree of freedom degradation and effectively improving the real-time performance and accuracy of pose estimation algorithm.

Sixth, the present invention uses feature points as a color evaluation standard of plane features, which improves the anti-interference of color features to illumination and enhances the robustness of pose estimation algorithm.

BRIEF DESCRIPTION OF DRAWINGS

The present invention will be further illustrated by the drawings, but the examples in the drawings do not constitute any limitation on the present invention. For a person skilled in the art, other drawings can be obtained according to the following drawings without involving any inventive effort.

DETAILED DESCRIPTION OF EMBODIMENTS

The present invention will be further described in combination with the following application scenarios.

Figure 1:
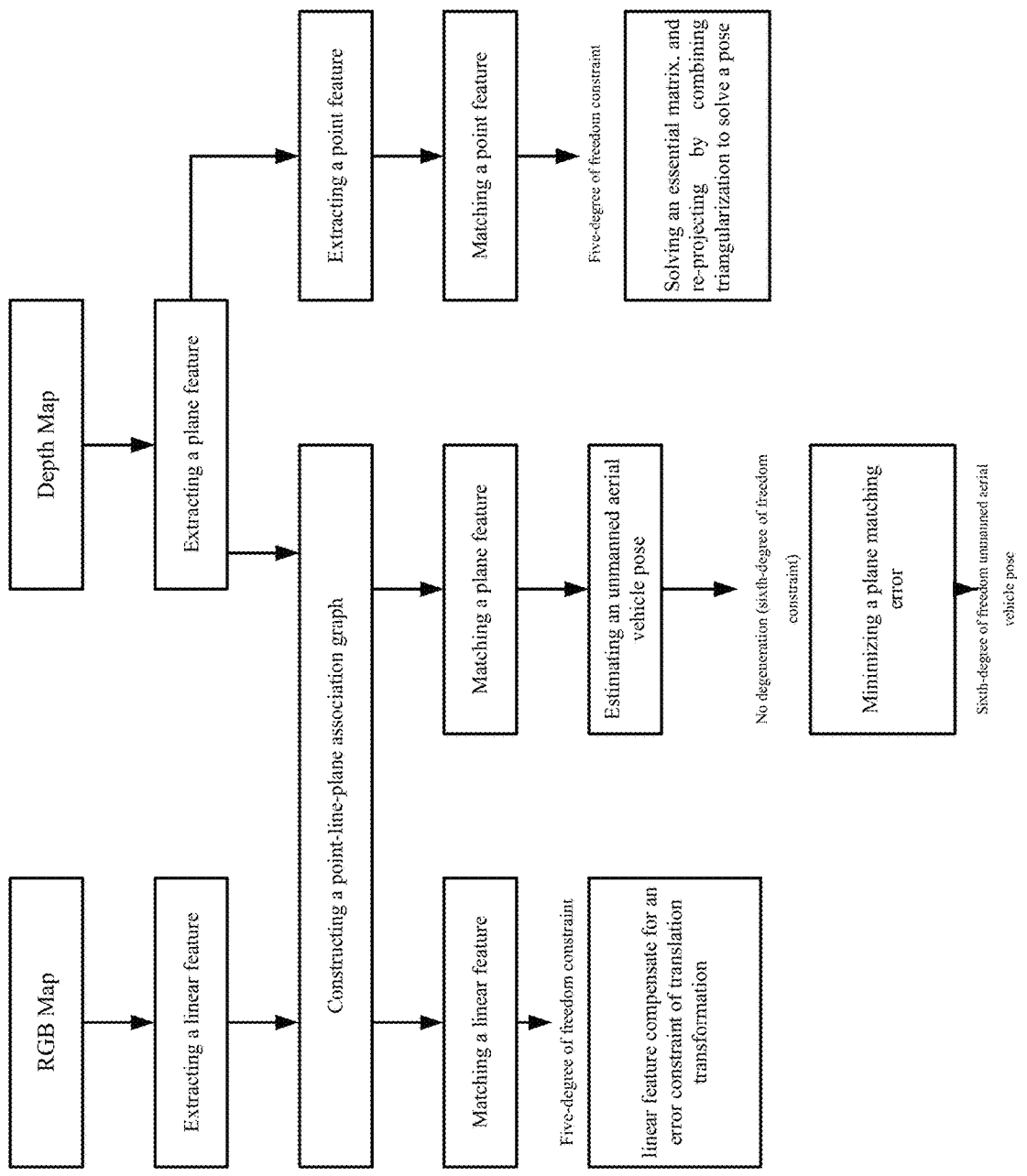
FIG. 1 is a schematic flow diagram of a pose estimation method for an unmanned aerial vehicle based on point, line and plane feature fusion according to the present invention.

With reference to the embodiment shown in FIG. 1, a pose estimation method for an unmanned aerial vehicle based on point, line and plane feature fusion, the method comprising the following steps:

in a first step, extracting an RGB image and a depth map by first using an RGB-D camera.

In a second step, constructing a plane parameter space (PPS) according to the depth map. The second step comprises mapping the points of the depth map from the Cartesian space to the PPS: for any point p in the Cartesian space, there being a plane $\pi=[n^T,d]^T$, which satisfies $n^T p + d = 0$, wherein $n^T=[n_x,n_y,n_z]^T$ is a normal vector of the plane, d is the distance from the origin point of a coordinate system to the plane. A mapping relationship between the plane parameter space (PPS) and the Cartesian space is shown in formula 1, wherein $[\theta_{PPS},\varphi_{PPS},d_{PPS}]$ is the three axes of PPS, $[n_x,n_y,n_z,d]$ is the normal vector of the plane and the distance from the plane to the origin point of the coordinate system in Cartesian space as shown above. Therefore, the coordinates of the point p in the PPS can be expressed as $p=[\theta_{PPS},\varphi_{PPS},d_{PPS}]^T$.

$$\begin{cases} \theta_{PPS} = \arccos(n_z) \\ \varphi_{PPS} = \arctan2(n_y, n_x) \\ d_{PPS} = d \end{cases} \quad \text{(formula 1)}$$

Figure 2:
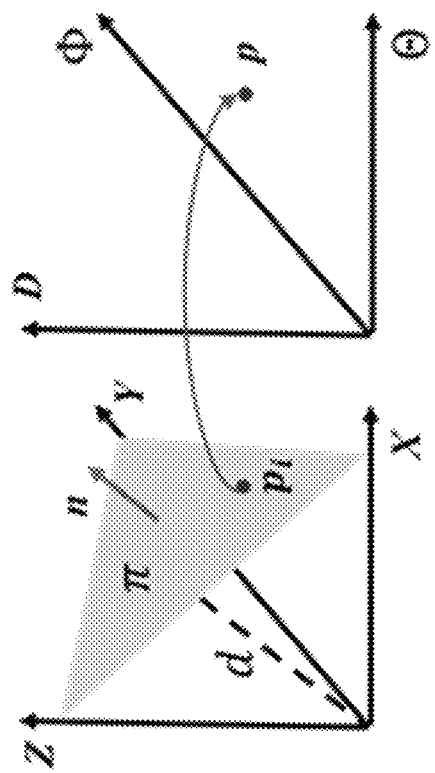
FIG. 2 is a schematic diagram of a mapping relationship between a plane parameter space and a Cartesian space according to the present invention.
Figure 2:
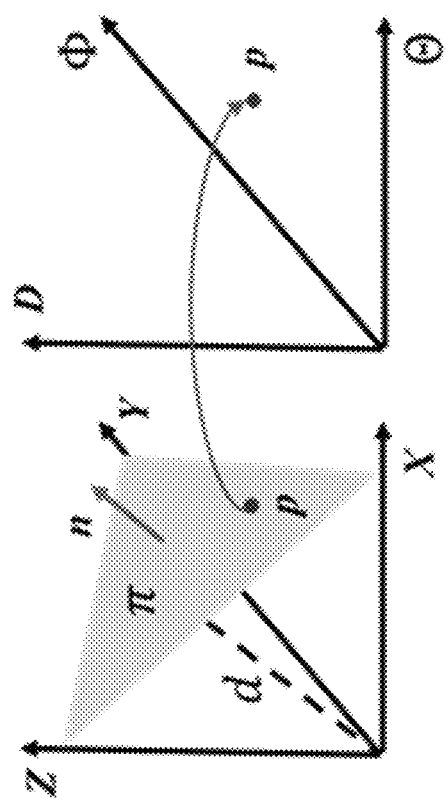

It can be seen from the mapping method that any point on the same plane in a Cartesian space maps to the same point in a PPS, that is, a plane in a Cartesian space maps to a PPS is a point. As shown in FIG. 2. Therefore, by means of searching the coordinates of points in a PPS and combining with the mapping formula of formula 1, the detection of plane features in a Cartesian space can be realized.

Figure 3:
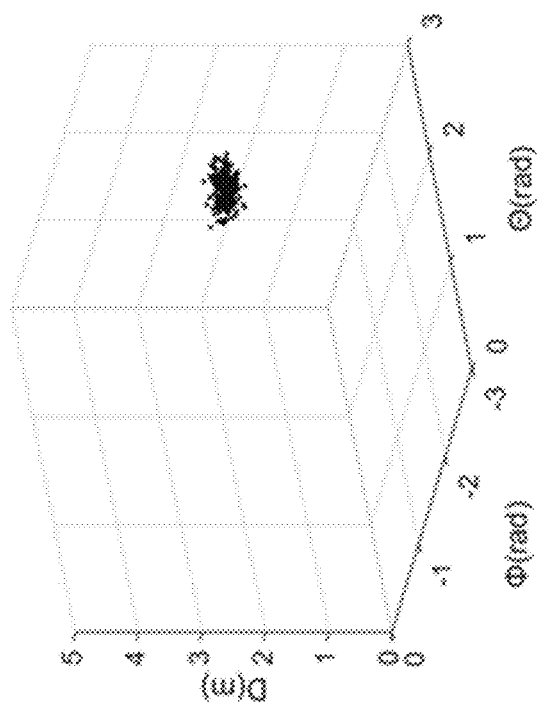
FIG. 3 is a schematic diagram of the mapping of a plane in a Cartesian space to a plane parameter space according to the present invention.
Figure 3:
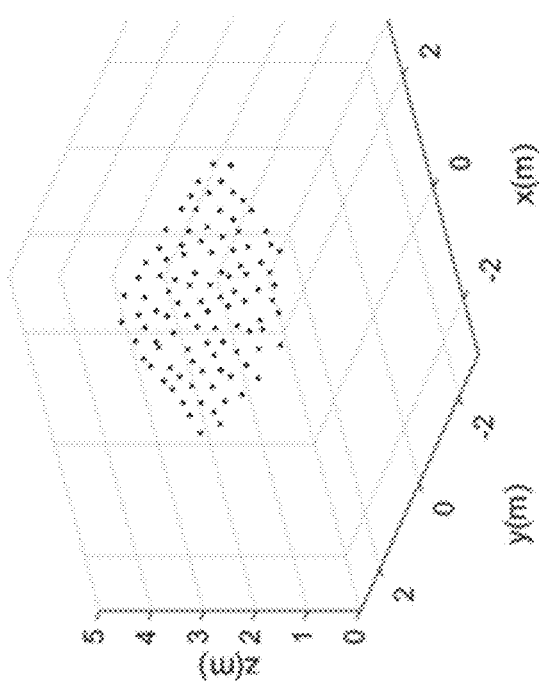

However, due to the noise interference of a sensor, a plane in a Cartesian space mapping to a PPS is often not a point, but at least a very concentrated point cloud, as shown in FIG. 3. Therefore, plane extraction in a Cartesian space can be transformed into fitting the distribution of points in a PPS.

In the embodiment, the fitting problem of the distribution of the points in the PPS is solved by expanding a STING structure into a three-dimensional structure.

In order to avoid mapping to a singular point $n^T=[0,0,\pm1]^T$ during mapping, before mapping, analyzing and calculating a common rotation matrix R in all plane by using a principal component, and then when mapping from the Cartesian space to the PPS, firstly left multiplying the normal vector N of the plane with the matrix R, and similarly, when the PPS is mapped to the Cartesian space, left multiplying the point p in the PPS with $R^T$, and then performing inverse mapping, so as to ensure that the points mapped to the PPS keep away from the singular point as much as possible.

A third step, constructing an inverse octree structure. In the embodiment, the idea of octree is used, reversely constructing cell nodes for a PPS according to an octree rule, and for each cell node, performing fitting by using Gaussian distribution. each cell includes a position mean $m_{cell}^{pps}$, a covariance s $S_{cell}^{pps}$ of data points in the PPS and the number $N_{cell}$ of data points included therein, which is denoted as cell=$\{m_{cell}^{pps}, S_{cell}^{pps}, N_{cell}\}$.

Figure 4:
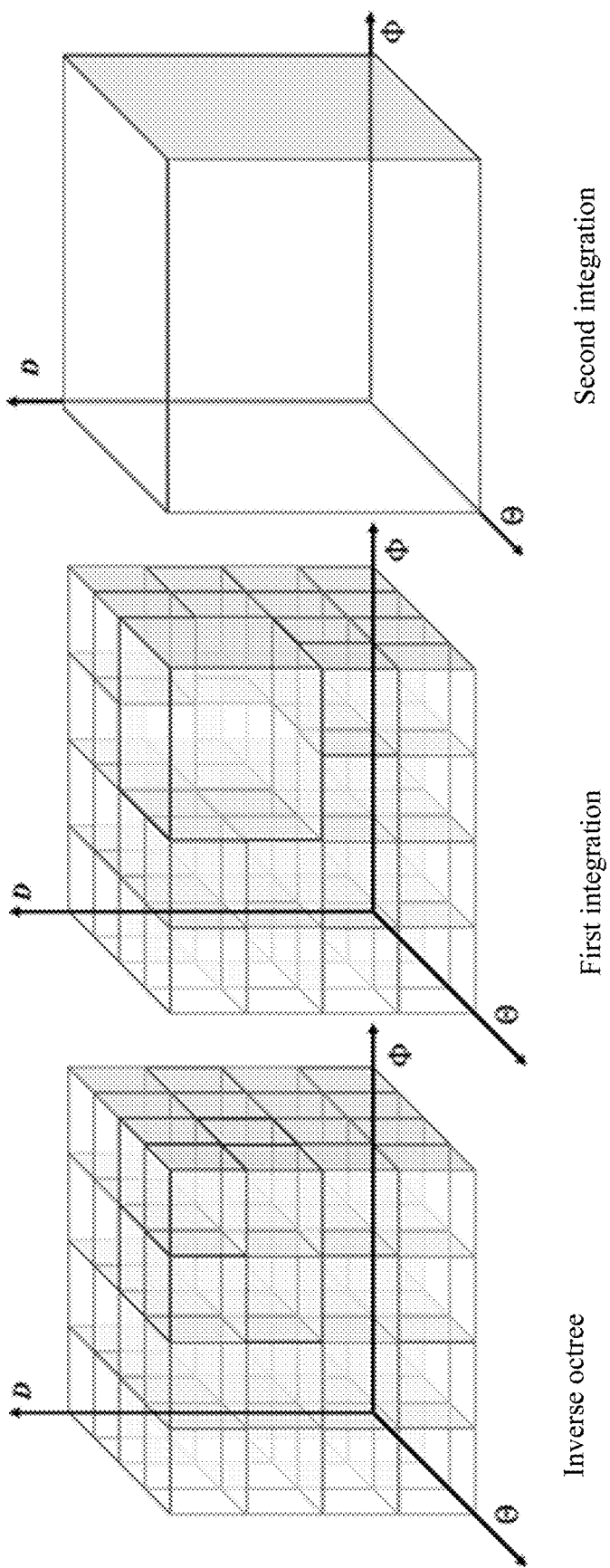
FIG. 4 is a schematic diagram of plane feature extraction of inverse octree according to the present invention.

A fourth step, extracting a plane feature. Design feature extraction algorithm on a basis of an inverse octree. Firstly, the algorithm divides the plane parameter space (PPS) into 64*64 small cubes. Finding a cube set $Q^{pps}$, which includes a point count exceeding a set threshold $th^{pps}$ (for example, the threshold is set to 100) in a cube interval, by traversing the series of cubes, then using any cube C therein as eight sub-nodes of the inverse octree respectively by traversing the cubes in $Q^{pps}$, checking whether a corresponding seven sub-nodes are all in the set $Q^{pps}$ according to the octree, and if so, integrating the eight nodes into one big node $C_i^{up}$(i=1, 2, ... 8), and updating the parameter of the big node by using the parameter cell=$\{m_{cell}^{pps}, S_{cell}^{pps}, N_{cell}\}$ of the eight nodes, as shown in FIG. 4. If there are multiple groups of nodes in cube C that satisfy an integration condition, performing determining according to the number of groups that satisfy the requirements, if the number of groups is equal to 8 groups, then recombining the eight big nodes into a larger node $C^{up2}$, otherwise, only taking a big node $C_{max}^{up}$=max$(C_i^{up})$ having the maximum number of data points $N_{cell}$, regarding other nodes as not being integrated, inserting the integrated nodes into the tail of the set $Q^{pps}$, and removing the node C from the set $Q^{pps}$. After the completion of traversal, regarding the remaining elements of the set $Q^{pps}$ as a corresponding cartesian space having a corresponding plane, the plane features of each plane being represented as $P_\pi=(\pi, m^{pps}, S^{pps}, N^{pps})$, wherein $\pi=[n^T,d]^T$ the location center and $m^{pps}$ is obtained by means of the inverse mapping.

In a fifth step, extracting a linear feature, detecting a line in the RGB image by using LSD (line segment detector) algorithm, and projecting the line into a three-dimensional camera coordinate system by combining depth map information, an obtained three-dimensional space linear parameter being represented as $L=[u^T,v^T]^T$, wherein v represents a unit normal vector of the line, u represents the normal vector of a plane composed of the line and the origin point of the camera, and the magnitude of a value of u represents the distance from the line to the origin point of the camera.

In a sixth step, extracting, a point feature by combining an RGB map. Traversing the plane extracted in step S4, dividing the parts in the RGB map corresponding to each plane into 10*10 cells, and extracting 10 ORB feature points in each cell, only retaining a feature point with the maximum response value therein, and discarding the remaining feature points.

In a seventh step, constructing a point-line-plane association graph. Using the extracted feature points, plane and linear feature as the nodes of the association graph, setting the feature node as an inactive node, and setting the plane node and the linear node as active nodes.

Constructing an edge $e_{\pi,p}=[\varphi_{\pi,p}, \text{index}]$ between the feature point and the plane $$\varphi_{\pi,p} = \begin{cases} 0, & \text{the feature point belongs to the plane} \\ 1, & \text{the feature point does not belongs to the plane} \end{cases};$$

index=r*10+c, the feature point is extracted from the cell of the rth row and the cth column of the plane;

constructing an edge $e_{\pi,\pi}=[\omega,\theta_{ij}^{\pi\pi},d_{ij}^{\pi\pi}]$ between planes:

$$\omega = \begin{cases} 0, & \text{two planes are parallel } (\theta_{ij}^{\pi\pi} < \theta_{th}) \\ 1, & \text{two planes are not parallel} \end{cases};$$

wherein is an identifier to indicate whether two planes are parallel or not;
$\theta_{ij}^{\pi\pi}=\arccos(n_i^T, n_j)$,
represents the angle between the normal vectors of two planes;

$$d_{ij}^{\pi\pi} = \begin{cases} |d_i - d_j| & \text{two planes are parallel} \\ 0, & \text{two planes are not parallel} \end{cases};$$

$d_{ij}^{\pi\pi}$ represents the distance between plane i and plane j;

constructing an edge $e_{\pi,L}=[I,\theta_{ij}^{L\pi},d_{ij}^{L\pi}]$ between the plane and the line:

$$I = \begin{cases} 0, & \text{the line is parallel to the plane } \left(\left|\frac{\pi}{2} - \theta_{ij}^{L\pi}\right| < \theta_{th}\right) \\ 1, & \text{the line is not parallel to the plane} \end{cases};$$

$\theta_{ij}^{L\pi}=\arccos(v_i^T, n_j)$
represents the angle between the line and the normal vector of the plane;

$$d_{ij}^{L\pi} = \begin{cases} |n_j^T[v_i]_x u_i + d_j|, & \text{the plane is parallel to the line} \\ 0 & \text{the plane is not parallel to the line} \end{cases}$$

wherein $d_{ij}^{L\pi}$ represents the distance between line i and plane j.

Figure 5:
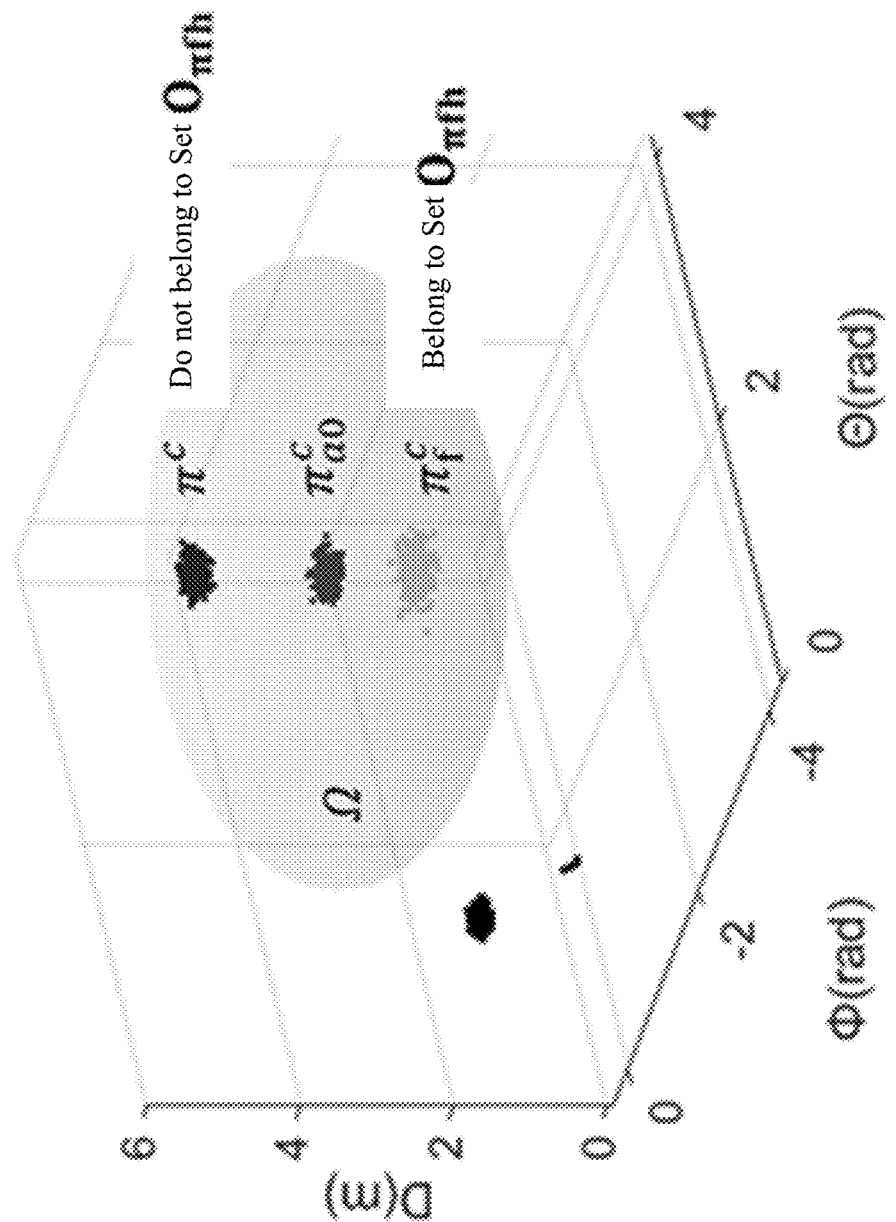
FIG. 5 is a schematic diagram of point-line-plane association graph matching according to the present invention.

In an eighth step, design the matching on a basis of a point-line-plane association graph. Extracting a plane-linear feature from the two adjacent frames, recording the plane-linear feature as $\{\pi_i^c, L_j^c, kp_{\pi i}^c\}$ and $\{\pi_m^r, L_n^r, kp_{\pi i}^r\}$, wherein c represents the current frame, r represents a reference frame, $\pi_i^c$ represents the ith plane feature extracted in the current frame, $L_j^c$ represents the jth linear feature extracted in the current frame, $kp_{\pi i}^c$ represents a feature point set of the ith plane in the current frame, $\pi_m^r$ represents the mth plane feature extracted in the reference frame, $L_n^r$ represents the nth linear feature extracted in the reference frame, $kp_{\pi i}^r$ represents a feature point set of the ith plane in the reference frame; and respectively constructing the corresponding point-line-plane association graph. Firstly, matching the feature points of two frames, wherein if there are two feature point sets $kp_{\pi k}^c$ and $kp_{\pi g}^r$, and a matching point pair thereof being larger than the set threshold $th_{kp}$ (for example, set to 50), it is considered that the plane $\pi_k^c$ of the current frame and the plane $\pi_g^r$ of the reference frame are matched in color. So as to obtain a set of planes $O_\pi=\{\pi_a^c, \pi_b^r\}$ that match in color; for each plane pair $\{\pi_{a0}^c, \pi_{b0}^r\}$ in $O_\pi$, in a neighborhood space $\Omega$, where $\pi_{a0}^c$ corresponds to a PPS coordinate, finding out all the plane pairs $O_{\pi fh}=\{\pi_f^c, \pi_h^r\}$ with a PPS coordinate being in $\Omega$, that satisfy $O_{\pi fh} \in O_\pi$ and $\pi_f^c$, as shown in FIG. 5. And using an edge relationship thereof to calculate the matching score, as represented by formula 2, $$Sc_\pi = \frac{1}{N_{O\pi fh}} \sum_{O_{\pi fh}} |e_{\pi cf,\pi ca} \cdot \text{diag}(10,1,0.2) \cdot e_{\pi rh,\pi rb}^T| \quad \text{(formula 2)}$$

wherein $N_{O\pi fh}$ represents the number of plane pairs in the $O_{\pi fh}$, $e_{\pi cf,\pi ca}$ represents an edge of the plane $\pi_{f0}^c$ and the plane $\pi_{a0}^c$, and $e_{\pi rh,\pi rb}^T$ represents an edge of the plane $\pi_{h0}^r$ and the plane $\pi_{b0}^r$, $\{\pi_{f0}^c, \pi_{h0}^r\} \in O_{\pi fh}$. If $Sc_\pi<3$, it is considered that the plane pairs $\{\pi_{a0}^c, \pi_{b0}^r\}$ are correctly matched plane pairs, otherwise, the plane pairs are considered to be mismatched plane pairs and are removed from the set $O_\pi$.

In a ninth step, matching a line feature. For each line in the linear feature sets $L_j^c$ and $L_n^r$ extracted in the eighth step (that is, the line feature $L_j^c$ and $L_n^r$ extracted from the current frame and the reference frame respectively), respectively finding out, by means of the respective point-line-plane association graph, an associated plane set which belongs to the set $O_\pi$ after the mismatched plane pairs are removed. Constraining the edge (and respectively recorded as $e_{Lcj,\pi c}$ and $e_{Lrn,\pi r}$) between an associated plane of $O_\pi$ to which the line belongs by using a least square method, as shown in formula 3, so as to realize the matching between lines, $$Sc_L = \text{argmin}(\|\Sigma|e_{Lcj,\pi c} \cdot \text{diag}(10,1,0.2) \cdot e_{Lrn,\pi r}^T|\|^2) \quad \text{(formula 3)}$$

wherein, $Sc_L$ is a loss function of the least square method, and a matching process is to use the least square method to iteratively update $Sc_L$ and obtain a result that makes the shortest line matches; $\|\Sigma|e_{Lcj,\pi c} \cdot \text{diag}(10,1,0.2) \cdot e_{Lrn,\pi r}^T|\|^2$ in a $Sc_L$ function represents a loss value obtained by means of the correlation graph assuming that the line $L_j^c$ and the line $L_n^r$ are matched line pairs.

In a tenth step, estimating an unmanned aerial vehicle pose. Compared with the linear feature and the point feature, plane features have stronger stability and robustness. Therefore, in the embodiment, estimating the pose by using the matched plane feature; and when the number of plane features is insufficient such that the pose can't be solved, then estimating the pose by combining the linear feature or by using a feature point feature.

In an eleventh step, estimating a plane pose and performing degradation detection. According to the plane feature pair set $O_\pi=\{\pi_a^c, \pi_b^r\}$ after removing the mismatched plane pairs, as shown in formula 4 and formula 5, calculating a three-dimensional rotation transformation matrix $R \in SO(3)$ of the RGB-D camera and a translation transformation matrix $t \in R^3$, and minimizing the error of a plane feature matching.

$$E_\pi^R = \sum_{O_\pi} \|n_{\pi a}^c - R n_{\pi b}^r\|^2 \quad \text{(formula 4)}$$

$$E_\pi^t = \sum_{O_\pi} \left(d_{\pi a}^c - \left(d_{\pi b}^r - (n_{\pi a}^c)^T t\right)\right)^2 \quad \text{(formula 5)}$$

In the formula, $E_\pi^R$ represents a rotation error of the plane feature matching; $E_\pi^t$ represents a translation error of the plane feature matching; $n_{\pi a}^c$ represents the normal vector of the plane in the current frame in a Cartesian coordinate system; $n_{\pi b}^r$ represents the normal vector of the plane in the reference frame in the Cartesian coordinate system; R represents a rotation transformation matrix from the reference frame to the current frame; $d_{\pi a}^c$ represents the distance from the plane $\pi_a^c$ in the current frame to the origin point of the coordinate system in the Cartesian coordinate system; $d_{\pi b}^r$ represents the distance from the plane $\pi_b^c$ in the reference frame to the origin point of the coordinate system in the Cartesian coordinate system; and t represents a translation transformation matrix from the reference frame to the current frame.

In order to detect whether the degeneration has occurred, constructing a matrix $H_E = \Sigma_{O_\pi} n_{\pi b}^r (n_{\pi a}^c)^T$ and performing SVD decomposition, if the matrix $H_E$ is a singular matrix and all three singular values are positive singular values, the degeneration having not occurred, and if there are two positive singular values and one zero singular value, degenerating to a solution with 5 degrees of freedom, otherwise degenerating to a solution with less than 5 degrees of freedom.

A twelfth step, estimating a 5 degree of freedom degeneration pose. When it degenerates to 5 degrees of freedom, it means that the plane features it matches are all parallel planes, so it is impossible to estimate the translation transformation t by using the formula 5. Therefore, when minimizing the translation error by formula 5, adding a linear feature matching error, as shown in formula 6, wherein $N_L$ is the number of linear feature pairs matched in the ninth step.

$$E_{L\pi}^t = E_\pi^t + \sum_{i=1}^{N_L} \|v_i^c \times q\| \cdot \|u_i^c - (Ru_i^r + [v_i^c]_\times t)\|^2 \quad \text{(formula 6)}$$

In the formula, $E_{L\pi}^t$ represents the translation error of combining plane feature matching and linear feature matching. It comprising: a translation error $E_\pi^t$ calculated according to the plane feature matching and a translation error $$\sum_{i=1}^{N_L} \|v_i^c \times q\| \cdot \|u_i^c - (Ru_i^r + [v_i^c]_\times t)\|^2$$

calculated according to the linear matching. $v_i^c$ represents the unit normal vector of the line $L_i^c$ in the current frame (variable v in the fifth step); q is a right singular vector of the zero singular value after the SVD decomposition of the matrix $H_E$ (it is stated in the eleventh step that there are two positive singular values and one zero singular value in 5 degrees of freedom). $u_i^c$ represents the normal vector of the plane composed of the line $L_i^c$ and the origin point of the camera in the current frame (variable u in the fifth step); $u_i^r$ is similar to $u_i^c$ and represents the normal vector of the plane composed of the line $L_j^r$ and the origin point of the camera in the reference frame; t represents the translation transformation matrix from the reference frame to the current frame, and R represents the rotation transformation matrix from the reference frame to the current frame; and $[v_i^c]_\times$ is a cross product matrix corresponding to a vector.

In a thirteen step, estimating a lower degree of freedom pose. When degenerating to a lower degree of freedom less than 5 degrees of freedom, calculating an essential matrix by directly using the matching point feature point pair, and according to an eight-point method, performing SVD decomposition on the essential matrix and re-projecting by combining triangularization to obtain a projection matrix, and finally performing RO on the projection matrix to obtain a solution pose.

A pose estimation method for an unmanned aerial vehicle based on point, line and plane feature fusion proposed according to the present invention.

1. Performing fusion on a point-line-plane feature and constructing a point-line-plane feature association graph, overcomes the problem of positioning accuracy in indoor weak texture environment and improves the accuracy of pose estimation.
2. Inverse octree algorithm is proposed innovatively. By means of designing nodes to extract plane features, it can avoid external interference and improve the extraction accuracy. By means of node fusion, adjacent data are merged reversely, which avoids the effect of speed reduction caused by octree node segmentation and improves the speed of plane feature extraction, thus improving the accuracy of pose estimation.
3. Using feature point matching as the color matching standard of plane features, reducing the RGB color change caused by illumination, thus affecting the color matching accuracy of plane features and improving the pose estimation accuracy.
4. The plane feature is used to solve the problem that the plane feature degenerates to 5 degrees of freedom, and the point feature is used to solve the problem that the plane feature degenerates to lower degrees of freedom, so as to realize more accurate and effective pose estimation.

Compared with the prior art, a pose estimation method for an unmanned aerial vehicle based on point, line and plane feature fusion proposed according to the present invention has the following advantages:

Firstly, the present invention extracts various point-line-plane features for the condition of artificial environment such as indoor environment, which can more effectively represent the features of surrounding environment, avoid reducing the influence caused by non-texture features, and has higher environmental robustness and stronger application universality.

Second, the present invention can fuse point-line-plane features, construct point-line-plane feature association graph, and realize more accurate pose estimation by using the association among multiple features.

Thirdly, the present invention only uses the information brought by the RGB-D camera, and the pose estimation of the unmanned aerial vehicle in the environment without a GPS, and interference of a medium and weak magnetic field and the like has higher accuracy.

Fourthly, the present invention innovatively proposes the inverse octree algorithm, which can effectively reduce the speed weakening caused by node splitting and improve the pose estimation accuracy of the unmanned aerial vehicle.

Fifth, according to different pose estimation situations, the present invention uses lines to make up for degree of freedom degeneration, or uses feature points to make pose estimation with lower degree of freedom, thus solving the problem of plane pose estimation degree of freedom degradation and effectively improving the real-time performance and accuracy of pose estimation algorithm.

Sixth, The present invention uses feature points as a color evaluation standard of plane features, which improves the anti-interference of color features to illumination and enhances the robustness of pose estimation algorithm.

It should be explained that the functional units/modules in the embodiments of the present invention may be integrated into one processing unit/modules, or the units/modules may be physically present individually, or two or more units/modules may be integrated into one unit/modules. The above-mentioned integrated units/modules may either be realized in the form of hardware, or be realized in the form of a software functional unit/modules.

From the above description of the embodiments, those skilled in the pertinent art may clearly understand that it should be understood that the embodiments described here can be implemented in hardware, software, firmware, middleware, code or any suitable combination thereof. For hardware implementation, a processor may be implemented in one or more of the following units: an application-specific integrated circuit (ASIC), a digital signal processor (DSP), a digital signal processing device (DSPD), a programmable logic device (PLD), a field programmable gate array (FPGA), a processor, a controller, a microcontroller, a microprocessor, other electronic units or a combination thereof designed to realize the functions described here. For software implementation, all or some of the procedures in the embodiment can be implemented by means of a computer program instructing relevant hardware. When implementation, the above-mentioned programs may be stored in a computer-readable medium or transmitted as one or more instructions or codes on the computer-readable medium. A computer-readable medium comprises a computer storage medium and a communication medium, wherein the communication medium comprises any medium which facilitates transmission of a computer program from one place to another place. The storage medium may be any usable medium accessible by a computer. The computer-readable medium may include, but is not limited to, a RAM, a ROM, an EEPROM, a CD-ROM or other optical disk storage, magnetic disk storage medium or other magnetic storage devices, or any other medium that can be used to carry or store desired program codes in the form of instructions or data structures and can be accessed by a computer.

Finally, it should be noted that the above examples are only used to illustrate the technical solution of the present invention, not to limit the scope of protection of the present invention. Although the present invention has been described in detail with reference to the preferred embodiments, a person of ordinary skill in the art should analyze that the technical solution of the present invention can be modified or replaced equivalently without departing from the essence and scope of the technical solution of the present invention.

The invention claimed is:

1. A pose estimation method for an unmanned aerial vehicle based on point, line and plane feature fusion, characterized by comprising:
S1 extracting an RGB image and a depth map by using an RGB-D camera;
S2 constructing a plane parameter space (PPS) according to the depth map, and mapping the depth map from a Cartesian space to the plane parameter space (PPS);
S3 constructing an inverse octree structure, comprising: reversely constructing cell nodes for the plane parameter space (PPS) according to octree data structure rules, and for each cell node, performing fitting by using Gaussian distribution;
S4 extracting one or more plane features, comprising: extracting the plane features on the basis of a feature extraction algorithm of the inverse octree;
S5 extracting a linear feature, comprising: extracting a linear feature on the RGB image by using a LSD algorithm detection;
S6 extracting a point feature by combining an RGB map;
S7 constructing a point-line-plane association graph;
S8 performing matching on the basis of the point-line-plane association graph of two adjacent frames; and
S9 estimating an unmanned aerial vehicle pose, comprising estimating the pose according to one or more matched plane features; and when the number of the one or more plane features is insufficient such that the pose can't be solved, then estimating the pose by combining the linear feature or by using a feature point feature.

2. The pose estimation method for an unmanned aerial vehicle based on point, line and plane feature fusion according to claim 1, characterized in that the step S2 comprises: for any point p of the depth map in the Cartesian space, there being a plane $\pi=[n^T,d]^T$, which satisfies $\pi=[n^T,d]^T$, wherein $n^T=[n_x,n_y,n_z]^T$ is a normal vector of the plane, d is the distance from the origin point of a coordinate system to the plane; a mapping relationship between the plane parameter space (PPS) and the Cartesian space is as follows:

$$\begin{cases} \theta_{PPS} = \arccos(n_z) \\ \phi_{PPS} = \arctan2(n_y, n_x) \\ d_{PPS} = d \end{cases}$$

wherein $[\theta_{PPS}, \phi_{PPS}, d_{PPS}]$ is the three axes of PPS, $[n_x, n_y, n_z, d]$ is the normal vector of the plane and distance from the plane to the origin point of the coordinate system in Cartesian space as shown above; then the coordinates of the point p in the PPS can be expressed as $p=[\theta_{PPS}, \phi_{PPS}, d_{PPS}]^T$.

3. The pose estimation method for an unmanned aerial vehicle based on point, line and plane feature fusion according to claim 2, characterized in that the step S2 further comprises: in order to avoid mapping to a singular point $n^T=[0,0,\pm1]^T$ during mapping, before mapping, analyzing and calculating a common rotation matrix R in all plane by using a principal component, and then when mapping from the Cartesian space to the PPS, firstly left multiplying the normal vector N of the plane with the matrix R, and similarly, when the PPS is mapped to the Cartesian space, left multiplying the point p in the PPS with $R^T$, and then performing inverse mapping.

4. The pose estimation method for an unmanned aerial vehicle based on point, line and plane feature fusion according to claim 3, characterized in that the step S3 comprises: wherein each cell includes a position mean $m_{cell}^{pps}$, a covariance $S_{cell}^{pps}$ of data points in the PPS and the number $N_{cell}$ of data points included therein, which is denoted as cell=$\{m_{cell}^{pps}, S_{cell}^{pps}, N_{cell}\}$.

5. The pose estimation method for an unmanned aerial vehicle based on point, line and plane feature fusion according to claim 4, characterized in that the step S4 comprises:
dividing the plane parameter space (PPS) as 64*64 small cubes, finding a cube set $Q^{pps}$, which includes a point count exceeding a set threshold $th^{pps}$ in a cube interval, by traversing the series of cubes, then using any cube C therein as eight sub-nodes of the inverse octree respectively by traversing the cubes in $Q^{pps}$, checking whether a corresponding seven sub-nodes are all in the set $Q^{pps}$ according to the octree, and if so, integrating the eight nodes into one big node $C_i^{up}$(i=1,2, ... 8), and updating the parameter of the big node by using the parameter cell={$m_{cell}^{pps}$, $S_{cell}^{pps}$, $N_{cell}$} of the eight nodes, if there are multiple groups of nodes in cube C that satisfy an integration condition, performing a determination according to a number of groups that satisfy a plurality of requirements, if the number of groups is equal to 8 groups, then recombining the eight big nodes into a larger node $C^{up2}$, otherwise, only taking a big node $C_{max}^{up}$=max($C_i^{up}$) having the maximum number of data points $N_{cell}$, regarding other nodes as not being integrated, inserting the integrated nodes into the tail of the set $N_{cell}$, and removing the node C from the set $Q^{pps}$; after the completion of traversal, regarding the remaining elements of the set $Q^{pps}$ as a corresponding cartesian space having a corresponding plane, the plane features of each plane being represented as $P_\pi$=($\pi$,$m^{pps}$,$S^{pps}N^{pps}$), wherein $\pi$=$[n^T,d]^T$ location center and $m^{pps}$ is obtained by means of the inverse mapping.

6. The pose estimation method for an unmanned aerial vehicle based on point, line and plane feature fusion according to claim 5, characterized in that the step S5 comprises: detecting a line in the RGB image by using the LSD algorithm, and projecting the line into a three-dimensional camera coordinate system by combining depth map information, an obtained three-dimensional space linear parameter being represented as L=$[u^T,v^T]^T$, wherein v represents a unit normal vector of the line, u represents the normal vector of a plane composed of the line and the origin point of the camera, and the magnitude of a value of u represents the distance from the line to the origin point of the camera.

7. The pose estimation method for an unmanned aerial vehicle based on point, line and plane feature fusion according to claim 6, characterized in that the step S6 comprises: traversing the plane extracted in step S4, dividing a plurality of parts in the RGB map corresponding to each plane into 10*10 cells, and extracting 10 ORB feature points in each cell, only retaining a feature point with the maximum response value therein, and discarding the remaining feature points.

8. The pose estimation method for an unmanned aerial vehicle based on point, line and plane feature fusion according to claim 7, characterized in that the step S7 comprises: using the extracted feature points, plane and linear feature as a plurality of nodes of the association graph, setting the feature node as an inactive node, and setting the plane node and the linear node as active nodes;

constructing an edge $e_{\pi,p}$=[($\varphi_{\pi,p}$, index] between the feature point and the plane $$\varphi_{\pi,p} = \begin{cases} 0, & \text{the feature point belongs to the plane} \\ 1, & \text{the feature point does not belong to the plane} \end{cases};$$

index=r*10+c, the feature point is extracted from the cell of the rth row and the cth column of the plane;
constructing an edge $e_{\pi,\pi}$=[$\omega$, $\theta_{ij}^{\pi\pi}$, $d_{ij}^{\pi\pi}$] between planes:

$$\omega = \begin{cases} 0, & \text{two planes are parallel } (\theta_{ij}^{\pi\pi} < \theta_{th}) \\ 1, & \text{two planes are not parallel} \end{cases};$$

$\theta_{ij}^{\pi\pi}$=arccos($n_i^T$, $n_j$), represents the angle between the normal vectors of two planes;

$$d_{ij}^{\pi\pi} = \begin{cases} |d_i - d_j| & \text{two planes are parallel} \\ 0, & \text{two planes are not parallel} \end{cases};$$

$d_{ij}^{\pi\pi}$ represents the distance between plane i and plane j; constructing an edge $e_{\pi,L}$=[I, $\theta_{ij}^{L\pi}$, $d_{ij}^{L\pi}$] between the plane and the line:

$$I = \begin{cases} 0, & \text{the line is parallel to the plane } \left(\left|\frac{\pi}{2} - \theta_{ij}^{L\pi}\right| < \theta_{th}\right) \\ 1, & \text{the line is not parallel to the plane} \end{cases};$$

$\theta_{ij}^{L\pi}$=arccos($v_i^T$,$n_j$),
represents the angle between the line and the normal vector of the plane;

$$d_{ij}^{L\pi} = \begin{cases} |n_j^T[v_i]_x u_i + d_j|, & \text{the plane is parallel to the line} \\ 0, & \text{the plane is not parallel to the line} \end{cases}$$

wherein $d_{ij}^{L\pi}$ represents the distance between line i and plane j.

9. The pose estimation method for an unmanned aerial vehicle based on point, line and plane feature fusion according to claim 8, characterized in that the step S8 comprises: extracting a plane-linear feature from the two adjacent frames, recording the plane-linear feature as {$\pi_i^c$,$L_j^c$,$kp_{\pi i}^c$} and {$\pi_m^r$,$L_n^r$,$kp_{\pi i}^r$}, wherein c represents the current frame, r represents a reference frame, $\pi_i^c$ represents the ith plane feature extracted in the current frame, $L_j^c$ represents the jth linear feature extracted in the current frame, $kp_{\pi i}^c$ represents a feature point set of the ith plane in the current frame, $\pi_m^r$ represents the mth plane feature extracted in the reference frame, $L_n^r$ represents the nth linear feature extracted in the reference frame, and $kp_{\pi i}^r$ represents a feature point set of the ith plane in the reference frame; and respectively constructing the corresponding point-line-plane association graph; firstly, matching the feature points of two frames, wherein if there are two feature point sets $kp_{\pi k}^c$ and $kp_{\pi g}^r$, and a matching point pair thereof being larger than the set threshold $th_{kp}$, it is considered that the plane $\pi_k^c$ of the current frame and the plane $\pi_g^r$ of the reference frame are matched in color, so as to obtain a set of planes $O_\pi$={$\pi_a^c$, $\pi_b^r$} that match in color; for each plane pair {$\pi_{a0}^c$,$\pi_{b0}^r$} in $O_\pi$, in a neighborhood space $\Omega$, where $\pi_{a0}^c$ corresponds to a PPS coordinate, finding out all the plane pairs $O_{\pi fh}$={$\pi_f^c$, $\pi_b^r$} with the PPS coordinate being in $\Omega$, that satisfy $O_{\pi fh} \in O_\pi$ and $\pi_f^c$, and using an edge relationship thereof to calculate the matching score:

$$Sc_\pi = \frac{1}{N_{O\pi fh}} \sum_{O_{\pi fh}} \left| e_{\pi cf,\pi ca} \cdot \text{diag}(10, 1, 0.2) \cdot e_{\pi rh,\pi rb}^T \right|$$

wherein $N_{O\pi fh}$ represents the number of plane pairs in the $O_{\pi fh}$, $e_{\pi cf,\pi ca}$ represents an edge of the plane $\pi_{f0}^c$ and the plane $\pi_{a0}^c$ and $e_{\pi rh,\pi rb}^T$ represents an edge of the plane $\pi_{h0}^r$ and the plane $\pi_{b0}^r$, {$\pi_{f0}^c$,$\pi_{h0}^r$}$\in O_{\pi fh}$, and if $Sc_\pi$<3, it is considered that the plane pairs {$\pi_{a0}^c$,$\pi_{b0}^r$} are correctly matched plane pairs, otherwise, the plane pairs are considered to be mismatched plane pairs and are removed from the set $O_\pi$;

for each line in the extracted linear feature sets $L_j^c$ and $L_n^r$, respectively finding out, by means of the respective point-line-plane association graph, an associated plane set which belongs to the set $O_\pi$, after the mismatched plane pairs are removed; constraining the edge between an associated plane of $O_\pi$ to which the line belongs by using a least square method, so as to realize the matching between lines; wherein a constraint function $Sc_L$ is:

$$Sc_L = \operatorname{argmin}(\|\Sigma | e_{Lcj,\pi c} \cdot \operatorname{diag}(10,1,0.2) \cdot e_{Lrn,\pi r}^T\|^2)$$

wherein $e_{Lcj,\pi c}$ and $e_{Lrn,\pi r}$ respectively represent the edge between the associated planes to which the line belongs to $O_\pi$; $S_{cL}$ is a loss function of the least square method, and a matching process is to use the least square method to iteratively update $S_{cL}$ and obtain a result that makes the shortest line matches; $\|\Sigma | e_{Lcj,\pi c} \cdot \operatorname{diag}(10,1, 0.2) \cdot e_{Lrn,\pi r}^T\|^2$ in a $S_{cL}$ function represents a loss value obtained by means of a correlation graph assuming that the line and the line $L_n^r$ are matched line pairs.

10. The pose estimation method for an unmanned aerial vehicle based on point, line and plane feature fusion according to claim 9, characterized in that, after the step S9, the method further comprises:

S10, estimating a plane pose and performing degradation detection, comprising: according to the plane feature pair set $O_\pi = \{\pi_a^c, \pi_b^r\}$ after removing the mismatched plane pairs, calculating a three-dimensional rotation transformation matrix $R \in SO(3)$ of the RGB-D camera and a translation transformation matrix $t \in R^3$, and minimizing the error of a plane feature matching;

$$E_\pi^R = \sum_{O_\pi} \|n_{\pi a}^c - R n_{\pi b}^r\|^2$$

$$E_\pi^t = \sum_{O_\pi} (d_{\pi a}^c - (d_{\pi b}^r - (n_{\pi a}^c)^T t))^2$$

in the formula, $E_\pi^R$ represents a rotation error of the plane feature matching; $E_\pi^t$ represents a translation error of the plane feature matching; $n_{\pi a}^c$ represents the normal vector of the plane in the current frame in a Cartesian coordinate system; $n_{\pi b}^r$ represents the normal vector of the plane in the reference frame in the Cartesian coordinate system; R represents a rotation transformation matrix from the reference frame to the current frame; $d_{\pi a}^c$ represents the distance from the plane $\pi_a^c$ in the current frame to the origin point of the coordinate system in the Cartesian coordinate system; $d_{\pi b}^r$ represents the distance from the plane $\pi_b^c$ in the reference frame to the origin point of the coordinate system in the Cartesian coordinate system; and t represents a translation transformation matrix from the reference frame to the current frame;

in order to detect whether the degeneration has occurred, constructing a matrix $H_E = \Sigma_{O_\pi} n_{\pi b}^r (n_{\pi a}^c)^t$ and performing SVD decomposition, if the matrix $H_E$ is a singular matrix and all three singular values are positive singular values, the degeneration having not occurred, and if there are two positive singular values and one zero singular value, degenerating to a solution with 5 degrees of freedom, otherwise degenerating to a solution with less than 5 degrees of freedom, wherein 5 degree of freedom degeneration pose estimation comprises: when degenerating to 5 degree of freedom, adding a linear feature matching error $$E_{L\pi}^t = E_\pi^t + \sum_{i=1}^{N_L} \|v_i^c \times q\| \cdot \|u_i^c - (R u_i^r + [v_i^c]_\times t)\|^2$$

while minimizing the translation error, wherein, $N_L$ is the number of the matched linear feature pair, $E_{L\pi}^t$ represents the translation error of combining plane feature matching and linear feature matching, which comprising: a translation error $E_\pi^t$ calculated according to the plane feature matching and translation error $$\sum_{i=1}^{N_L} \|v_i^c \times q\| \cdot \|u_i^c - (R u_i^r + [v_i^c]_\times t)\|^2$$

calculated according to the linear matching; $v_i^c$ represents the unit normal vector of the linear $L_i^c$ in the current frame; q is a right singular vector of the zero singular value after the SVD decomposition of the matrix $H_E$; $u_i^c$ represents the normal vector of the plane composed of the line $L_i^c$ and the origin point of the camera in the current frame; $u_i^r$ of represents the normal vector of the plane composed of the line $L_j^r$ and the origin point of the camera in the reference frame; t represents the translation transformation matrix from the reference frame to the current frame, and R represents the rotation transformation matrix from the reference frame to the current frame; and $[v_i^c]_\times$ is a cross product matrix corresponding to a vector $v_i^c$;

the lower degree of freedom pose estimation comprises: when degenerating to a lower degree of freedom less than 5 degrees of freedom, calculating an essential matrix by directly using the matching point feature point pair, and according to an eight-point method, performing SVD decomposition on the essential matrix and re-projecting by combining triangularization to obtain a projection matrix, and finally performing RO on the projection matrix to obtain a solution pose.

\* \* \* \* \*